United States Patent [19]

Niskin

[11] Patent Number: 4,492,363

[45] **Date of Patent: * Jan. 8, 1985**

[54] MULTIPLE PULLEY SHEAVE ASSEMBLY WITH RETAINER PULLEYS

[76] Inventor: Shale J. Niskin, 3415 Chase Ave., Miami Beach, Fla. 33140

[ * ] Notice: The portion of the term of this patent subsequent to Nov. 29, 1998 has been disclaimed.

[21] Appl. No.: 467,932

[22] Filed: Feb. 18, 1983

Related U.S. Application Data

[63] Continuation-in-part of Ser. No. 313,758, Oct. 22, 1981, Pat. No. 4,417,718, which is a continuation-in-part of Ser. No. 222,970, Jan. 7, 1981, Pat. No. 4,301,995, which is a continuation of Ser. No. 105,666, Dec. 20, 1979, abandoned, which is a continuation of Ser. No. 027,311, Apr. 5, 1979, abandoned.

[51] Int. Cl.$^3$ .......................... B66D 3/08; G01P 3/50

[52] U.S. Cl. .................................. 254/394; 254/275; 254/411; 73/862.45

[58] Field of Search ............... 254/390, 395, 396, 397, 254/398, 401, 402, 403, 404, 405, 406, 407, 408, 409, 410, 411, 412, 413, 414, 415, 416, 273, 276; 324/174; 254/393; 73/862.45

[56] References Cited

U.S. PATENT DOCUMENTS

| | | | |
|---|---|---|---|
| 1,348,691 | 8/1920 | Beaumont | 254/390 X |
| 1,968,321 | 7/1934 | Shope | 254/416 X |
| 3,372,908 | 3/1968 | McCarthy | 254/405 |
| 3,780,989 | 12/1973 | Peterson | 254/276 X |
| 3,871,621 | 3/1975 | Jackson | 254/394 X |
| 3,898,563 | 8/1975 | Erisman | 324/174 X |
| 3,902,701 | 9/1975 | Orme | 254/415 |
| 4,301,995 | 11/1981 | Niskin | 254/411 |

OTHER PUBLICATIONS

Bulletin HCL 1, Features and Description Heck Check Linemonitor, 9/1979.

The General Oceanics Hydroblock System Notes on Tension Measurement.

*Primary Examiner*—Stuart S. Levy
*Assistant Examiner*—Joseph J. Hail, III
*Attorney, Agent, or Firm*—William A. Newton

[57] ABSTRACT

Disclosed is a multiple pulley sheave assembly for supporting a cable comprising a plurality of pulleys, including a center pulley, mounted in an arcuate path on a support frame; a pair of retainer pulleys for keeping the bend of the cable constant around the center pulley; a cable monitor coupled to the center pulley for measuring the tension, footage, and cable speed; counterbalancing weights positioned above the support frame and rigidly connected thereto; and a suspension arrangement, connected at the center of the assembly, for providing rotation of the assembly about two perpendicular axes of rotation, whereby the cable stays within a plane defined by the arcuate path.

5 Claims, 7 Drawing Figures

MULTIPLE PULLEY SHEAVE ASSEMBLY WITH RETAINER PULLEYS

CROSS-REFERENCE TO RELATED APPLICATIONS

This application is a continuation-in-part of copending application, Ser. No. 313,758 now U.S. Pat. No. 4,417,718, filed Oct. 22, 1981 now issued U.S. Pat. No. 4,417,718, which in turn is a continuation-in-part application Ser. No. 222,970 filed Jan. 7, 1981 now issued U.S. Pat. No. 4,301,995, which is a continuation of Ser. No. 105,666, Dec. 20, 1979, abandoned, which is a continuation of Ser. No. 27,311, Apr. 5, 1979, abandoned. U.S. Pat. No. 4,301,995 is incorporated by specific reference thereto.

BACKGROUND OF THE INVENTION

1. Field of the Invention

This invention relates to sheaves and is particularly directed to a multiple sheave assembly.

2. Description of the Prior Art

At present, for such activities of lowering wire cables to which sensors and instruments are attached, as in hydrographic work from ships, a freely suspended, single sheave is employed. In the prior art, line monitors are commonly used to measure cable or line tension, line speed and footage of the cable. An illustrative example of such a system is shown in a brochure entitled "Heck Check Linemonitor", Bulletin HCL 1, manufactured by the Heckerman Corporation of Inglewood, Calif. In these systems a pair of outer pulleys are mounted in offset relation to a center pulley so that the line is bent around the center pulley, the amount of bend being forced to be constant. The amount of downward force applied to the center pulley is a function of the line tension and the bend and is measured by the line monitor. Magnets adjacent to the center pulley are used in the measurement of line footage and speed and a straingauge is used in the measurement of line tension.

There is an inherent disadvantage to these prior art line monitors. The three pulley arrangement severely bends the line in three separate places, leading to wear and damage of the line. This is particularly true with steel cables wherein the individual strands are twisted.

The problems with large single sheave assemblies without counter balancing are described in co-pending application Ser. No. 313,758.

U.S. Pat. Nos. 3,172,642; 3,132,844; 3,042,374; and 3,032,320 disclose various multiple sheave arrangements of the prior art. U.S. Pat. No. 1,348,691 to Beaumont discloses a counter-balanced pulley arrangement that exists in the prior art.

A brochure entitled "The General Oceanics Hydroblock System—Notes on Tension Measurements" by General Oceanics, Inc. of Miami, Fla. illustrates one single pulley system wherein tension measurements were made by using a load cell, i.e., a strain gauge.

SUMMARY OF THE INVENTION

The present invention is directed toward a sheave assembly for supporting a cable having a tension applied thereto comprising a plurality of cable-receiving pulleys positioned in an arcuate path for receiving the cable, including at least two outer pulleys and a center pulley positioned therebetween. A pair of retaining pulleys are positioned immediately adjacent the cable on the side of the cable opposite the side adjacent to the cablereceiving pulleys, with one of the retainer pulleys being on either side of the center pulley. A line monitor is operatively coupled to the center pulley for measuring the tension, speed and footage of the cable.

In operation, the retainer pulleys will always maintain a constant bend of the cable around the center pulley, regardless of the angle between the two ends of the cable extending from the sheave assembly; hence, a continually accurate tension measurement can be made with the minimal amount of bending of the cable.

BRIEF DESCRIPTION OF THE DRAWINGS

Further objects and advantages of the present invention will become apparent as the following description proceeds, taken in conjunction, with the accompanying drawings in which.

DESCRIPTION OF THE PREFERRED EMBODIMENT

Figure 1:
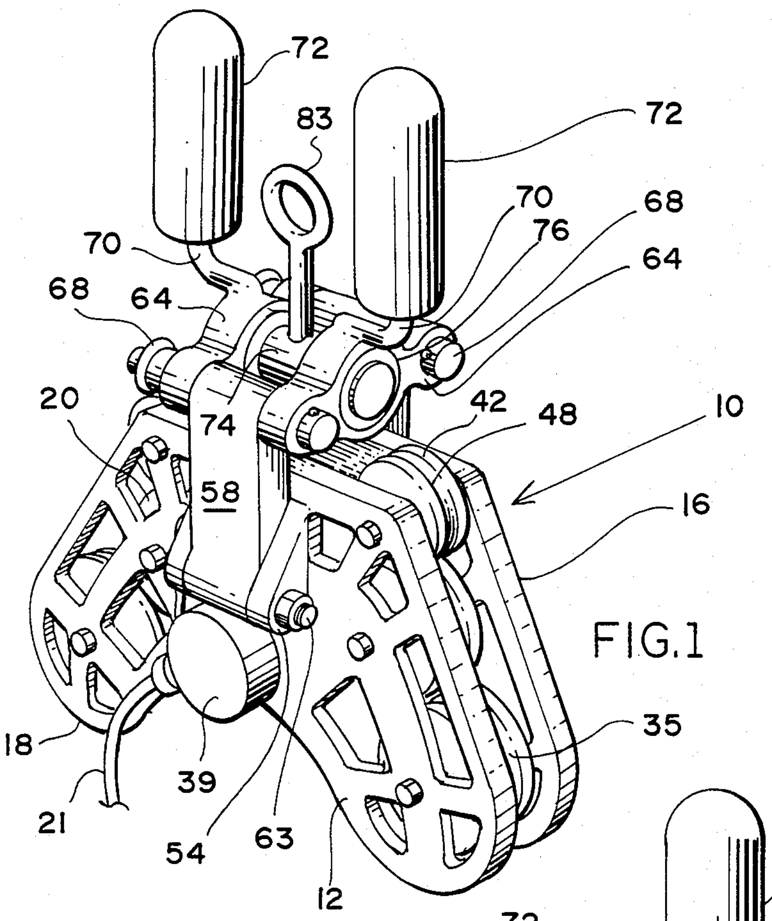
FIG. 1 is a perspective view of the sheave assembly of the present invention.
Figure 2:
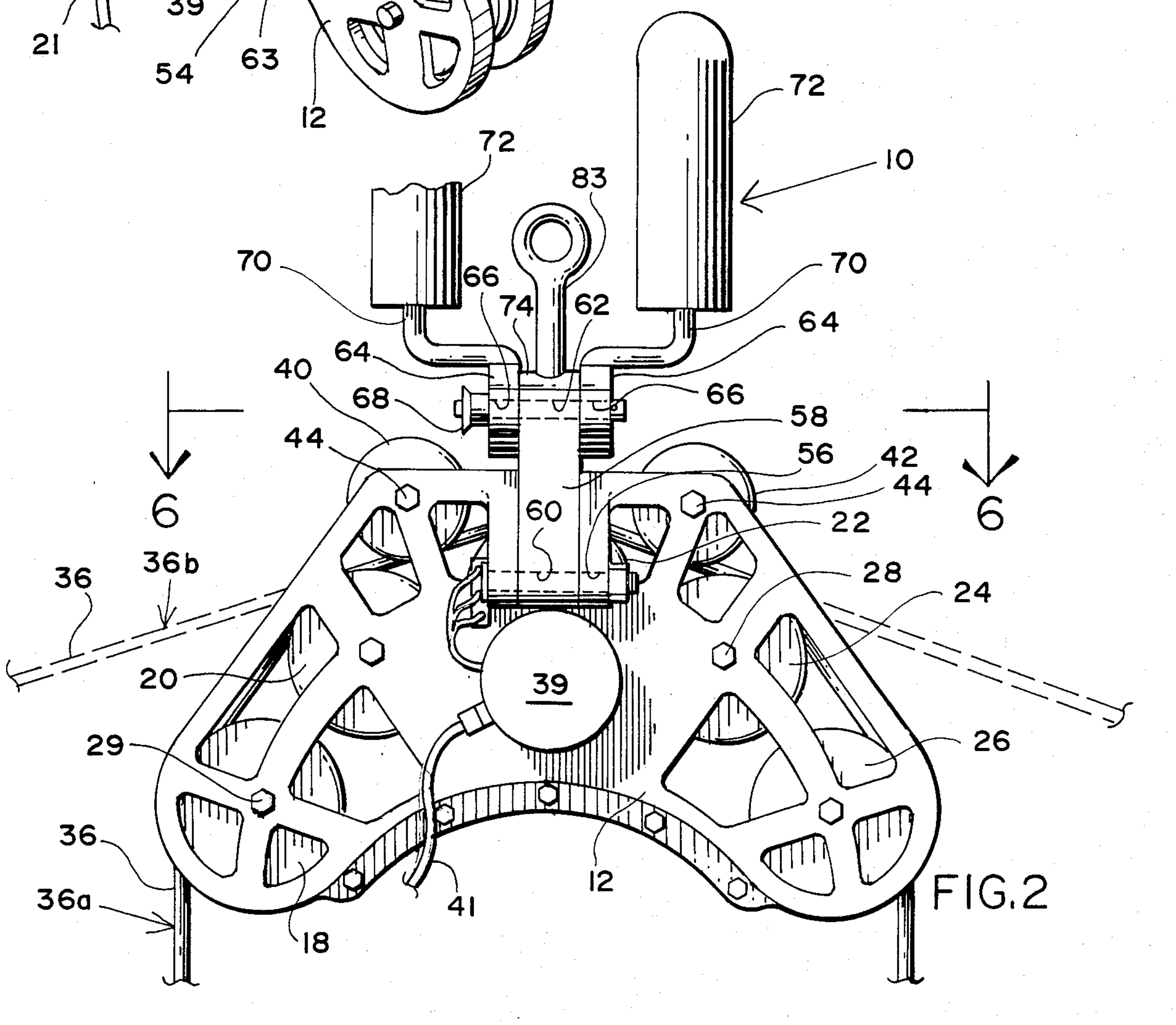
FIG. 2 is a side view of the sheave assembly showing the cable in two positions so as to illustrate that the cable maintains a constant bend around center pulley.

As shown in the FIGURES, there is disclosed a multiple pulley sheave assembly 10 constructed in accordance with the present invention. The assembly 10 includes a support frame 12 having a pair of opposed sides 14 and 16. Mounted between sides 14 and 16 in an arcuate path are five cable-receiving pulleys 18, 20, 22, 24 and 26. Within the five cable-receiving pulleys, pulley 22 is identified as the center pulley, while the remaining pulleys 18, 20, 24, and 26 are referred to as outer pulleys. The outer pulleys 18, 20, 24 and 26 are secured by bolts 28 and nuts 29, which traverse the sides 14 and 16. The center pulley 22 is mounted inside of a U-bracket 30 slidingly secured within opposed slots 31 and 32 formed in the interior walls of the sides 14 and 16, as shown in FIG. 3.

At the bottom of the center pulley 22 is a conventional strain gauge 34 disposed to measure the tension of a line or cable 36 which is positioned over the pulleys in groves 35. More specifically, the strain gauge 34 provides upward biasing, so that the downward force of the cable on the center pulley 22 causes the gauge to slightly compress. With a known constant bend of the cable around the center pulley, the degree of compression of the strain gauge can be translated into line tension. Consequently, the strain gauge measures the force applied by the cable at an angle substantially perpendicular to the arcuate path of the cable-receiving pulleys. Although a right angle is preferred, any substantial angle to the arcuate path at the center pulley is sufficient to allow for the tension of the cable to be measured.

Figure 3:
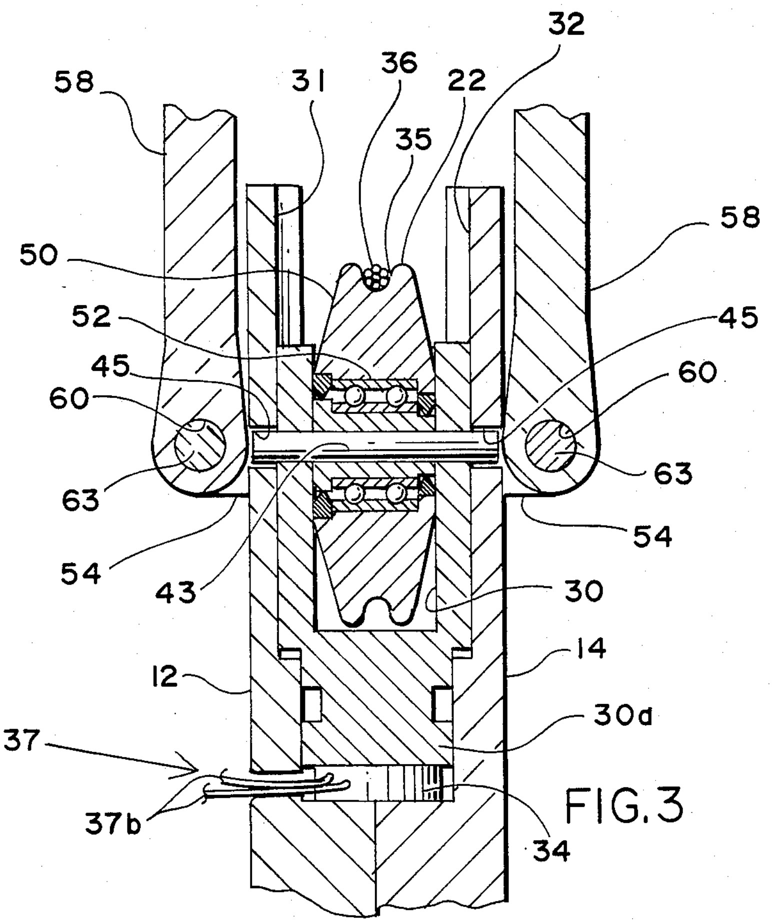
FIG. 3 is a fragmentary, cross-sectional view taken through the center pulley to show the location of the strain sensor.
Figure 4:
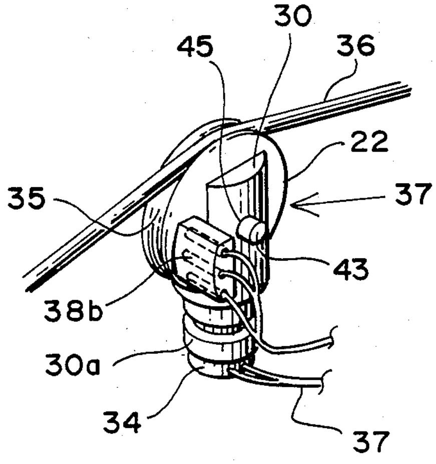
FIG. 4 is a fragmentary, perspective view of the center pulley mounted in its U-bracket, along with the magnetic and strain sensors.
Figure 5:
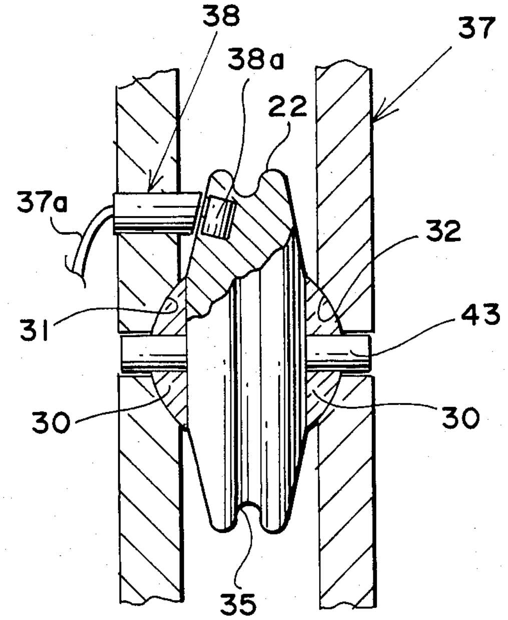
FIG. 5 is a fragmentary, cross-sectional, top view of the center pulley in its U-bracket, which in turn is slidingly mounted inside of the support frame.
Figure 6:
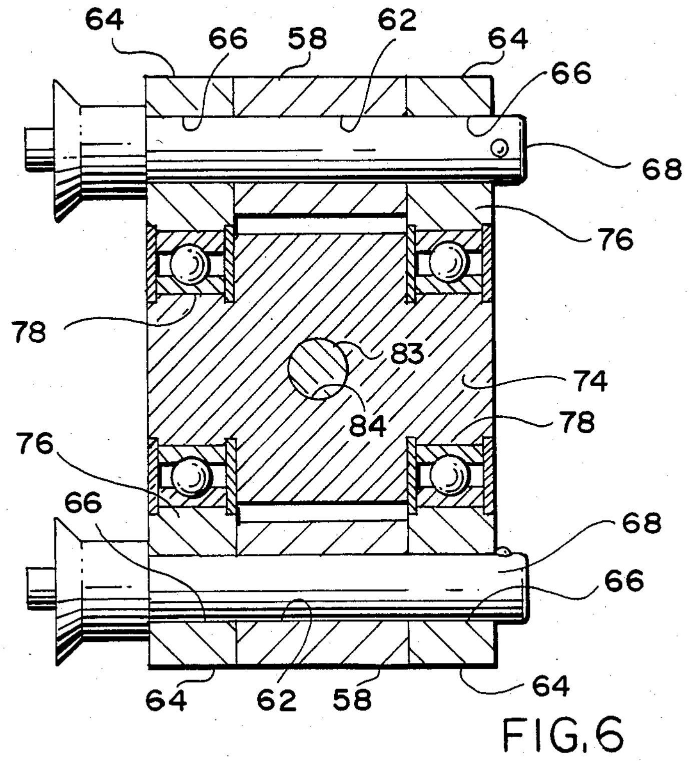
FIG. 6 is a cross-sectional view taken with respect to cross section lines 6—6 in FIG. 2.
Figure 7:
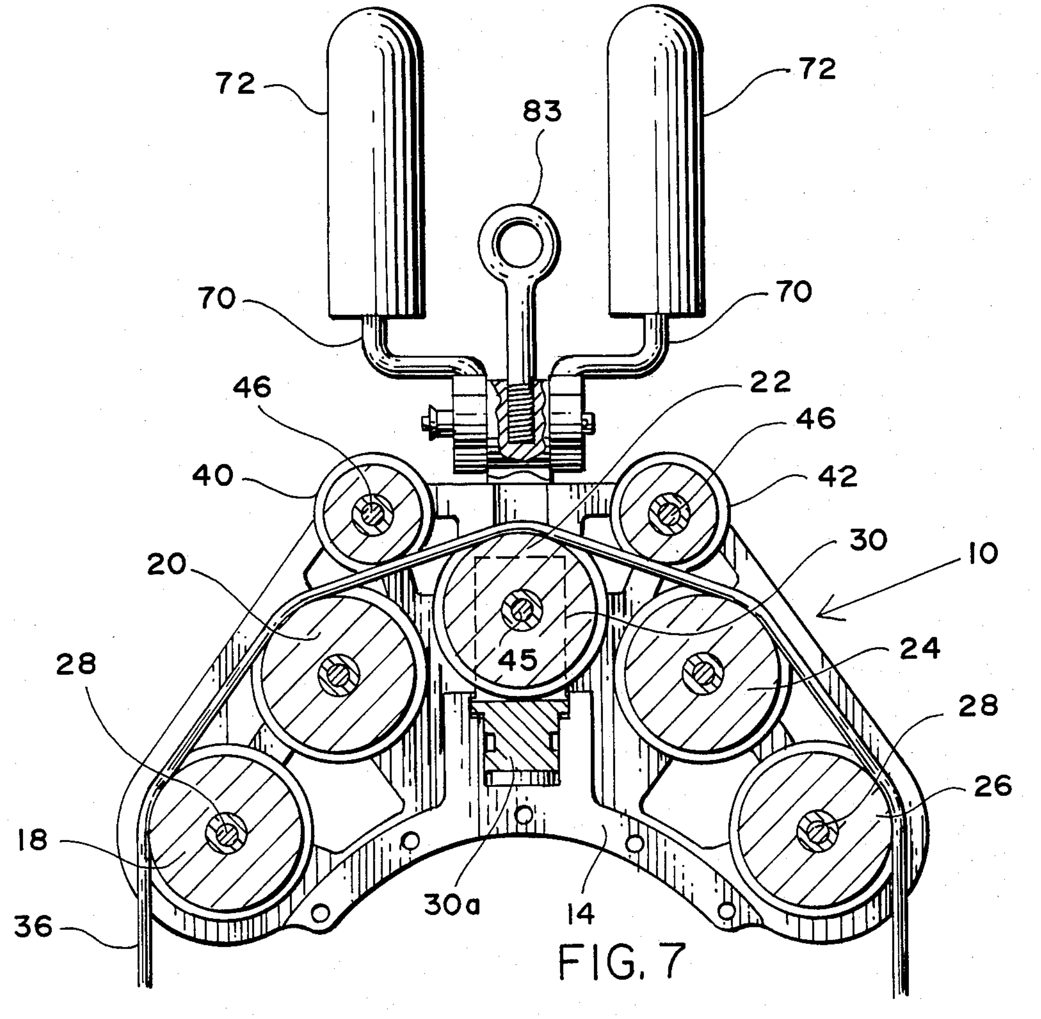
FIG. 7 shows the sheave assembly with one of its sides of the support frame removed.

As shown in FIGS. 3 through 5, a line monitoring unit, generally identified by numeral 37, is illustrated and is of conventional design and is commercially available. It includes not only the sensors of the strain gauge 34 but also a magnet sensor unit 38 for measuring the line speed and footage of the cable 36. More specifically, the magnetic sensor unit 38 includes a magnet 38A mounted in the center pulley 22 and a magnetic sensor 38B mounted in the frame 12 adjacent to the center pulley 22. Electrical leads 37A and 37B connect the sensor 38 and strain gauge 34, respectively, to a housing 39, which contains amplifiers for amplifying the signals from the sensors. The amplified signals are transmitted over the electrical cable 41 to a readout console (not shown) for calculations and display of the parameters. FIG. 3 illustrates the strain gauge 34 location. The U-bracket 30 has a lower portion 30A which engages the gauge 34, as the downward force of the pulley 36 pushes the U-bracket downward. The slots 31 and 32 allow the U-bracket to move only up or down but not sideways. The slots 31 and 32 have a matching arcuate configuration to receive the corresponding arcuate upper positions of the U-bracket 30. The center pulley is rotatably mounted on an axle 43, which passes through the opposed sides of the U-bracket and extends into a pair of holes 45 formed in opposed sides of the support frame 12. The holes 45 have a sufficient diameter so as to allow for the desired downward movement of the U-bracket, although such movement is normally not much greater than one-one thousandth of an inch (1/1,000 inch).

Mounted on the opposed side of the line 36, relative to the pulleys 18 through 26, is a pair of retainer pulleys 40 and 42. These pulleys 40 and 42 are secured to the sides 14 and 16 by way of bolts 44 and nuts 46. When the cable 36 is in the position indicated in the drawings, the pulleys 40 and 42 are in non-pressure, nonbending contact with the cable 36 with the cable being inside the grooves 48. In other words, although the pulleys 40 and 42 are positioned immediately adjacent the cable 36, they do not engage the cable to the extent of significantly bending the same. In this manner, the number of significant bends in the cable 36 are greatly reduced. The pulley 40 is positioned to be immediately adjacent the line extending between the pulleys 20 and 22, while the pulley 42 is positioned to be immediately adjacent the line extending between the pulleys 22 and 24.

As the ends of the cable 36 are progressively raised upward toward an illustrative upward position 36B, the cable will eventually cease to be in contact with the pulleys 20 and 24, as the cable approaches a horizontal disposition. At this point, the retaining pulleys 40 and 42 will maintain the angles of the cable with respect to the center pulley 22, i.e., the bend around the pulley 22 will remain constant; hence, an accurate reading of the tension will be maintained. It can be seen that there can be no significant gap between the cable 28 and the surface of the grooves 48 of the pulleys 40 and 42, otherwise, when the cable is in the previously described upward position, the bend around the center pulley 24 will be changed. In this manner, regardless of the angle of the ends of the cable 36, relative to the assembly 10, a constant, predetermined bend is maintained around the center pulley 22 for the purpose of measuring line tension. Additionally, since the line is always engaging the center pulley, even when the line is nearly horizontal, there is never a situation wherein line speed and footage cannot be measured.

The invention requires at least the cablereceiving pulleys 20, 22 and 24 and the retainer pulleys 40 and 42, i.e. 5 pulleys. Although the outer pulleys 18 and 26 are desirable in implementation shown, they are not necessary to the invention. Additionally, more outer pulleys past pulleys 18 and 26 can be added, if desired. In normal contemplated use, most of the time the pulleys 18 through 26 would have significant pressure applied thereto by the cable, with the line rarely applying significant pressure to the retaining pulleys 40 and 42. In other words, the illustrated downward position of the cable is normal during the vast majority of the operating time in most contemplated usages of the assembly 10. Preferably, but not necessarily, pulleys 40 and 42 have smaller diameters than the cable-receiving pulleys 18 through 26.

Each cable-receiving or retaining pulley comprises a steel ring 50 rotatably mounted on a ball bearing race 52, which in turn is mounted on an axle comprising bolts 28 or 44, respectively. Each axle of the pulleys traverses the opposed sides 14 and 16 of the support frame 12. The ball bearing race 52 is interposed between the periphery of the axle and the steel ring 50 to provide relatively frictionless rotational movement. Each of the cable-receiving or retaining pulleys is provided with an integrally formed, open groove 35 or 48, respectively, to receive the cable 36. Although it is contemplated that the primary use of the assembly 10 will be with steel cables, the invention is not limited to the steel cable. Hence, the term "cable" in the claims will be intended to cover line, rope, steel cable, cable or other like cable elements.

The cable-receiving pulleys 18 through 26 are aligned in a downwardly arcuate path or curve along the curved length of the support frame 12. Preferably, although not necessarily, the arcuate path for alignment of the cable-receiving pulleys has an increasing rate of curvature as the path extends outward and downward from its center. By virtue of the configuration, stress on the strands of the cables is equalized over the pulleys. The cable 36 is positioned over the cablereceiving pulleys, so as to fit in each of the grooves 35. Force applied by the cable to the strain gauge is perpendicular to the arcuate path defined above.

Preferably, but not necessarily, the multiple pulley assembly 10 described to this point can be used with a counter balanced arrangement which is described hereinafter. A pair of opposed mounts 54 are formed in the opposed sides of the frame 12 at its center portion. Each mount 54 has a bore hole 56 formed therein, such holes being disposed in equally spaced relationship from a plane which bisects the frame 12 and the pulleys 18–26 and 40 and 42. A pair of opposed side arms 58 each have at each end bore holes 60 and 62. A nut and bolt 63 extends through the holes 56 and 60 to secure the lower ends of the two side arms to the frame 12.

The remainder of the structure is the same as shown in incorporated U.S. Pat. No. 4,401,995, from which this application is a continuation in part. Briefly described, connecting means are provided in the form of a pair of opposed side frames 64, each having a pair of bore holes 66 aligned with the bore holes 62. A pair of quick-release pins 68 pass through the holes 62 and 66 so as to rigidly couple the support frame 12 to the side frames 64. The connecting means further includes the side frames 64 having, respectively, a pair of upwardly extending, rigidly connected weight support arms 70. Rigidly mounted on top of the weight support arms 70 are counter-balancing means in the form of a pair of weight members 72, respectively. Consequently, the weights 72, weight support arms 70, the side frames 64 and the support frame 12 are all rigidly secured together.

Suspension means are provided for allowing pivotal motion about two axis, which are perpendicular to each other. The suspension means includes a first rotatable member 74, in the form of a swivel shaft, which is pivotally mounted between the opposed sides of the side frames 64. By virtue of this pivotal connection, the connecting means which includes the side frames 64; the counter balancing weight members 72; and the support frame 12 with the pulleys mounted thereto, all rotate as a single unit about the pivotal axis of the swivel shaft 74. The swivel shaft 74 is rotatably mounted in a pair of circular apertures 76, one of the pair being formed in each of the side frames 64 between and slightly above the holes 66. A ball bearing race 78 is positioned between each of the side frames 64 and the swivel shaft 74 to provide relatively frictionless rotational movement of the shaft 74 about its pivot axis.

The suspension means further includes a second rotatable member 83, in the form of eyebolt, which extends through an opening 84 formed in the swivel shaft 74 and terminates in a counter-bored portion, where a nut secures the eye bolt 83 against removal therefrom, but permits the rotation thereof. The axis of rotation of the eye bolt 83 is substantially perpendicular to the pivot axis of the swivel shaft 74. With light loads, the pivot axis of the eye bolt 83 will be at an angle with respect to the plane containing the arcuate path and the cable.

As described above, the suspension means are pivotally connected to the connecting means. However, this is only because the balance center (where the counter-balancing moments are equal) occurs there.

The arcuate path upon which the cable-receiving pulleys are centered lies within a single plane, which approximately passes through the cable 36 at all times. Generally, this plane has at least a substantial vertical component. Each of the pulleys has an axis of rotation which is the center axis of the axles. These axes of rotation are substantially perpendicular to the plane containing the arcuate path and the cable 36. The swivel shaft 74 has its pivotal axis parallel to the plane containing the arcuate path and perpendicular to the axes of rotation of the pulleys. Preferably, but not necessarily, this pivotal axis lies in the plane containing the arcuate path.

In normal use of the sheave assembly 10, it is suspended by the eye bolt 83 so that the cable 36, being payed over the plurality of the pulleys is above ground or platform level and extends downwardly from either end of the elevated frame 12. The frame 12 can swing in a horizontal plane about the axis of rotation of the eye bolt 83 and in a vertical plane about the axis of rotation of the swivel shaft 74; thereby automatically maintaining at all times the cable 36 in the plane of the arcuate path. As a result, the cable will be lying evenly in the groove of each cable-receiving pulley.

As can be readilv seen, the center of mass of the sheave 20 can be a substantially shorter distance from its pivotal mounting than that required by the single sheave design of incorporated U.S. Pat. No. 4,301,995. Additionally, the total weight of the frame 12 and the pulleys is substantially less than that of the single sheave. The closer center of mass and less weight of the present invention allows the counter-balancing weights to be substantially lighter and/or shorter in length. The more compact design of the sheave assembly 10 readily allows the same to be used in space limited situations, such as exists on ships. The lighter weight of the sheave assembly allows for easier mounting and handling of the assembly.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A sheave assembly for supporting a cable, comprising:
- a support frame;
- a plurality of cable-receiving pulleys for receiving the cable comprising at least two outer pulleys and a center pulley positioned therebetween, each of said cable-receiving pulleys being rotatably mounted to said support frame along an arcuate path with their axes of rotation being substantially perpendicular to a plane containing said arcuate path;
- a pair of retaining pulleys being rotatably mounted to said support frame with their axes of rotation being substantially perpendicular to said plane, said retaining pulleys being positioned immediately adjacent said cable on the side of said cable opposite that side which is adjacent to said cable-receiving pulleys, one of said retainer pulleys being on one side of said center pulley and the other retainer pulley being on the opposed side of said center pulley;
- cable monitoring means operatively coupled to said center pulley for measuring the tension of said cable; whereby the bend of said cable remains substantially constant regardless of the direction of the ends of the cable extending from said sheave assembly, said cable monitoring means includes means for slidably mounting said center pulley to provide movement of said center pulley in a direction substantially angled with respect to said arcuate path at said center pulley and strain measuring means operatively coupled to said means for slidably mounting said center pulley for measuring the force applied by the cable to said center pulley in said direction substantially angled with respect to said arcuate line, whereby the force is used to determine the line tension of the cable, wherein said arcuate path of said cable-receiving pulleys has an increasing rate of curvature as the path extends outward and downward from its center.

2. The sheave assembly of claim 1, wherein said cable monitoring means includes means for measuring any one of the parameters of cable footage and cable speed.

3. The sheave assembly of claim 2, wherein said outer pulleys include four outer pulleys, two on each side of said center pulley.

4. A sheave assembly of claim 3 further including,
- counter-balancing means positioned above said support frame;

connecting means disposed between said counterbalancing means and said support frame for rigidly interconnecting the same;

suspension means pivotally connected to said connecting means with its pivotal axis being substantially parallel to said plane containing said arcuate path; whereby said plane containing said arcuate path at all times approximately passes through and lies parallel with the cable positioned over said sheaves.

5. The counter-balanced sheave assembly of claim 4 wherein said suspension means includes a first rotatable member, having said pivot axis, rotatably mounted at its ends to said connecting means; and a second rotatable member pivotally secured to said first rotatable member with its rotation axis being substantially perpendicular to said pivot axis of said first rotatable member, said second rotatable member being operable for supporting said counter-balanced sheave assembly.

* * * * *